(12) United States Patent
Ahmed et al.

(10) Patent No.: US 10,585,185 B2
(45) Date of Patent: Mar. 10, 2020

(54) SECURITY SCANNING SYSTEM WITH WALK-THROUGH-GATE

(71) Applicant: Rohde & Schwarz GmbH & Co. KG, Munich (DE)

(72) Inventors: Sherif Ahmed, Starnberg (DE); Frank Gumbmann, Nuremberg (DE); Athanasios Karamalis, Munich (DE); Andreas Schiessl, Munich (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 350 days.

(21) Appl. No.: 15/424,133

(22) Filed: Feb. 3, 2017

(65) Prior Publication Data
US 2018/0224538 A1    Aug. 9, 2018

(51) Int. Cl.
G01S 13/86    (2006.01)
G01S 13/88    (2006.01)
G01S 7/02     (2006.01)
G01S 13/00    (2006.01)

(52) U.S. Cl.
CPC ........... *G01S 13/867* (2013.01); *G01S 7/024* (2013.01); *G01S 13/887* (2013.01)

(58) Field of Classification Search
CPC ...... G01S 13/867; G01S 7/024; G01S 13/887; H01Q 1/44
USPC ................... 340/573.1; 342/27, 28
See application file for complete search history.

(56) References Cited

U.S. PATENT DOCUMENTS

| 2,649,538 | A | * | 8/1953 | Marlowe | G08B 13/183 340/552 |
|---|---|---|---|---|---|
| 4,019,184 | A | | 4/1977 | Dorey | |
| 4,026,157 | A | | 5/1977 | Goebbels | |
| 4,087,814 | A | * | 5/1978 | Spirig | G01S 13/56 340/554 |
| 4,443,792 | A | | 4/1984 | Pidgeon et al. | |
| 5,184,145 | A | | 2/1993 | Devillers et al. | |

(Continued)

FOREIGN PATENT DOCUMENTS

| AU | 903296 | 4/1996 |
|---|---|---|
| AU | 839199 | 2/1999 |

(Continued)

OTHER PUBLICATIONS

M. Agnes et al, "Webster's New World College Dictionary," Fourth Edition; entry for the word "passageway" on p. 1052; Wiley Publishing, Inc., Cleveland, Ohio, USA; copyright in the year 2007; ISBN 0-02-863119-6. (Year: 2007).*

(Continued)

*Primary Examiner* — Bernarr E Gregory

(74) *Attorney, Agent, or Firm* — Ditthavong & Steiner, P.C.

(57) ABSTRACT

A system for scanning a form of interest, while the form of interest is in motion, is provided. The system comprises a first detector panel-pair, comprising a first detector panel and a second detector panel, spatially offset from the first detector panel by a first continuous passageway for the motion of the form of interest. A second detector panel-pair comprises a third detector panel and a fourth detector panel, spatially offset from the third detector panel by a second continuous passageway for the motion of the form of interest, and a location-tracking device adapted to monitor the location of the form of interest.

28 Claims, 11 Drawing Sheets

(56) References Cited

U.S. PATENT DOCUMENTS

| | | | |
|---|---|---|---|
| 5,371,347 A | 12/1994 | Plesko | |
| 5,371,490 A * | 12/1994 | Martinides | G08B 13/2414 340/572.4 |
| 5,600,303 A | 2/1997 | Husseiny et al. | |
| 5,692,029 A | 11/1997 | Husseiny et al. | |
| 5,831,261 A | 11/1998 | Plesko | |
| 6,094,472 A * | 7/2000 | Smith | G01N 23/203 378/86 |
| 6,204,778 B1 * | 3/2001 | Bergan | G08G 1/075 340/905 |
| 6,222,503 B1 * | 4/2001 | Gietema | H01Q 1/1207 343/700 MS |
| 6,307,475 B1 * | 10/2001 | Kelley | G01S 13/56 340/506 |
| 6,309,600 B1 | 10/2001 | Hunter | |
| 6,353,224 B1 | 3/2002 | Sinclair et al. | |
| 6,424,264 B1 * | 7/2002 | Giraldin | G06K 17/00 340/573.1 |
| 6,529,016 B1 | 3/2003 | Blank | |
| 6,754,368 B1 | 6/2004 | Cohen | |
| 6,872,180 B2 | 3/2005 | Reinhardt et al. | |
| 6,894,612 B2 * | 5/2005 | Xydis | G08B 21/0227 340/539.11 |
| 6,965,340 B1 | 11/2005 | Baharav et al. | |
| 7,365,672 B2 * | 4/2008 | Keller | G01S 13/887 342/179 |
| 7,405,692 B2 * | 7/2008 | McMakin | G01S 13/887 342/22 |
| 7,772,976 B2 * | 8/2010 | Christopher | G06K 17/00 340/572.1 |
| 7,978,120 B2 * | 7/2011 | Longstaff | G01S 13/003 342/179 |
| 8,026,820 B2 * | 9/2011 | Nurmela | G08B 21/0415 340/540 |
| 8,106,812 B2 * | 1/2012 | Andersson | G01S 13/003 342/22 |
| 8,193,486 B2 | 6/2012 | Liu et al. | |
| 8,378,988 B1 * | 2/2013 | Artino | H04N 7/186 235/382 |
| 8,618,931 B2 * | 12/2013 | Rossmann | G01S 5/0205 340/539.13 |
| 8,823,581 B2 * | 9/2014 | Mostov | G01S 13/887 342/118 |
| 8,866,619 B2 * | 10/2014 | Knibbe | H05B 37/0227 340/573.1 |
| 8,890,684 B2 * | 11/2014 | Tkachenko | G01S 13/003 340/539.11 |
| 9,282,258 B2 | 3/2016 | Kuznetsov et al. | |
| 9,316,732 B1 | 4/2016 | Mohamadi | |
| 9,329,138 B2 * | 5/2016 | Kuznetsov | G01N 33/227 |
| 9,843,103 B2 * | 12/2017 | Bowers | G01S 13/885 |
| 10,222,466 B2 * | 3/2019 | Schiessl | G01S 13/887 |
| 10,261,177 B2 * | 4/2019 | Ahmed | G01S 13/887 |
| 10,338,214 B2 | 7/2019 | Ellenbogen et al. | |
| 10,382,300 B2 | 8/2019 | Ellenbogen et al. | |
| 2002/0026321 A1 | 2/2002 | Faris et al. | |
| 2002/0110625 A1 | 8/2002 | Garwood | |
| 2004/0000999 A1 | 1/2004 | Turner et al. | |
| 2004/0059503 A1 * | 3/2004 | Peters | G08G 1/04 701/300 |
| 2004/0080448 A1 * | 4/2004 | Lovberg | G01S 13/887 342/22 |
| 2004/0090359 A1 | 5/2004 | McMakin et al. | |
| 2004/0222790 A1 | 11/2004 | Karmi et al. | |
| 2005/0174195 A1 | 8/2005 | Heiniger et al. | |
| 2006/0016700 A1 | 1/2006 | Brister et al. | |
| 2006/0081764 A1 | 4/2006 | Lee et al. | |
| 2007/0056396 A1 | 3/2007 | Mawer | |
| 2007/0273355 A1 | 11/2007 | Becker et al. | |
| 2008/0112705 A1 | 5/2008 | Ridgway et al. | |
| 2010/0072361 A1 | 3/2010 | Liu et al. | |
| 2010/0085237 A1 | 4/2010 | Cornic et al. | |
| 2010/0265117 A1 | 10/2010 | Weiss | |
| 2011/0181300 A1 | 7/2011 | Bowring et al. | |
| 2013/0127667 A1 | 5/2013 | Schneider et al. | |
| 2014/0167784 A1 | 6/2014 | Ahmed | |
| 2014/0273865 A1 * | 9/2014 | Skarda | H01Q 1/084 455/66.1 |
| 2015/0207224 A1 | 7/2015 | Rose | |
| 2015/0253422 A1 | 9/2015 | Morton et al. | |
| 2015/0287235 A1 | 10/2015 | Rose | |
| 2015/0310713 A1 | 10/2015 | Kellermann et al. | |
| 2016/0117898 A1 | 4/2016 | Kuznetsov et al. | |
| 2016/0143558 A1 | 5/2016 | Chernokalov et al. | |
| 2016/0216371 A1 | 7/2016 | Ahmed et al. | |
| 2016/0291148 A1 | 10/2016 | Ellenbogen et al. | |
| 2016/0356886 A1 * | 12/2016 | Valdes | G01S 13/003 |
| 2017/0099200 A1 | 4/2017 | Ellenbogen et al. | |
| 2017/0160419 A1 | 6/2017 | Kuznetsov et al. | |
| 2017/0192638 A1 | 7/2017 | Iscoe et al. | |
| 2017/0270366 A1 | 9/2017 | Kuznetsov et al. | |
| 2017/0193403 A1 | 11/2017 | Iscoe et al. | |
| 2018/0017667 A1 | 1/2018 | Rose | |
| 2018/0074190 A1 | 3/2018 | Clemence et al. | |
| 2018/0172871 A1 | 6/2018 | Kuznetsov et al. | |
| 2018/0173161 A1 | 6/2018 | Chen et al. | |

FOREIGN PATENT DOCUMENTS

| | | | |
|---|---|---|---|
| BE | 890143 | | 12/1981 |
| CA | 2020581 A1 | | 1/1991 |
| CA | 2275378 A1 | | 12/2000 |
| CA | 2314813 A1 | | 2/2001 |
| CA | 2930078 A1 | | 5/2015 |
| CA | 2944756 A1 | | 10/2015 |
| CA | 2980216 A1 | | 10/2016 |
| CA | 2981487 A1 | | 10/2016 |
| CN | 104635233 A | | 5/2015 |
| CN | 105068069 A | | 11/2015 |
| CN | 204740342 U | | 11/2015 |
| CN | 204758823 U | | 11/2015 |
| DE | 2507401 A1 | | 1/1976 |
| DE | 2511750 B1 | | 2/1976 |
| DE | 3738222 C1 | | 5/1989 |
| DE | 10352422 B3 | | 4/2005 |
| DE | 102004020282 A1 | | 7/2006 |
| EP | 501816 A2 | | 9/1992 |
| EP | 890161 A4 | | 1/1999 |
| EP | 1157355 A1 | | 11/2001 |
| EP | 1647834 A1 | | 4/2006 |
| EP | 2138870 A2 | | 12/2009 |
| EP | 2263101 A2 | | 12/2010 |
| EP | 2933654 A1 | | 10/2015 |
| EP | 3097607 A1 | | 11/2016 |
| EP | 3126869 A1 | | 2/2017 |
| EP | 3278140 A1 | | 2/2018 |
| EP | 3400517 A1 | | 11/2018 |
| FR | 850369 A | | 12/1939 |
| FR | 2254843 A1 | | 7/1975 |
| FR | 2913774 A1 | | 9/2008 |
| GB | 200321754 | | 9/2003 |
| GB | 200904640 | | 4/2009 |
| IL | 186884 A | | 2/2009 |
| IL | 248615 A | | 2/2017 |
| JP | 2014056289 A | | 3/2014 |
| JP | 2014153177 A | | 8/2014 |
| RU | 2578298 C1 | | 3/2006 |
| WO | 9308539 A1 | | 4/1993 |
| WO | 9737336 A1 | | 10/1997 |
| WO | 9921148 A1 | | 4/1998 |
| WO | 9911373 A2 | | 3/1999 |
| WO | 0046743 A1 | | 8/2000 |
| WO | 2000050974 A2 | | 8/2000 |
| WO | 20118654 A1 | | 1/2001 |
| WO | 200130655 A2 | | 5/2001 |
| WO | 200363290 A2 | | 7/2003 |
| WO | 200369320 A2 | | 8/2003 |
| WO | 200382117 A1 | | 10/2003 |
| WO | 2009115818 A2 | | 9/2009 |
| WO | WO2010/140943 A1 * | | 12/2010 ............ G08B 31/00 |
| WO | WO2011/128418 A1 * | | 10/2011 ............ G01S 13/887 |
| WO | 2016156717 A1 | | 10/2016 |

(56) References Cited

FOREIGN PATENT DOCUMENTS

| WO | 2016161362 A1 | 10/2016 |
|---|---|---|
| WO | 201762610 A1 | 4/2017 |
| WO | 2017118936 A1 | 7/2017 |
| WO | 2017136032 A1 | 8/2017 |
| WO | 2018078627 A1 | 5/2018 |

OTHER PUBLICATIONS

Apstec Systems, "A Disruptive Technology Breakthrough in Stand-off Suicide Bomber Detection", Human Security Radar, Oct. 21, 2016, 11 Pages.

Gumbmann et al., "Multistatic Walk Through Screening with mmWave Technology", Form & Content Media LTD, Sep. 2016, 3 Pages.

Digital Barriers, "Detecting Concealed Person Borne Threats in Public Places Without Impacting Footfall", ThruVis, 2016, retrieved on Feb. 2, 2017 from https://www.digitalbarriers.com/storage/app/media//Downloads/Solutions/ThruVis/ThruVis%20for%20Public%20Spaces%20Factsheet.pdf, 2 Pages.

Zhuravlev et al., "Microwave Imaging of Moving Subjects by Combined Use of Video-tracker and Multi-static Radar", IEEE International Conference on Microwaves, Communications, Antennas and Electronic Systems (COMCAS 2015), Tel Aviv, Israel, Nov. 2-4, 2015, 5 Pages.

Ahmed et al., "A Novel Fully Electronic Active Real-Time Imager Based on a Planar Multistatic Sparse Array", IEEE Transactions on Microwave Theory and Techniques, vol. 59, No. 12, Dec. 2011, 10 Pages.

Ahmed, "Personnel Screening with Advanced Multistatic Imaging Technology", Passive and Active Millimeter-Wave Imaging XVI, Proc. of SPIE, vol. 8715, 87150B, 2013, 6 Pages.

\* cited by examiner

SECURITY SCANNING SYSTEM WITH WALK-THROUGH-GATE

TECHNICAL FIELD

The invention relates to a security scanning system, especially for scanning walking persons.

BACKGROUND ART

In recent years, activities at public spaces like airport entrances and government buildings have significantly increased in public perception. A number of solutions for ensuring security have been suggested in the past.

For example the document US 2016/0216371 A1 shows a security scanning system. In this system, the person to be scanned has to enter a scanning chamber and has to hold still during a scanning period. In the system shown there, the person to be scanned even has to cooperate by turning around, as instructed. This system requires the cooperation of the person.

Accordingly, there is a need to provide a scanning system, which achieves a high scanning throughput without requiring the cooperation of the person to be scanned.

SUMMARY OF THE INVENTION

According to a first aspect of the invention, a system for scanning a form of interest, while the form of interest is in motion, is provided. The system comprises a first detector panel-pair, comprising a first detector panel and a second detector panel, spatially offset from the first detector panel by a first continuous passageway for the motion of the form of interest, a second detector panel-pair, comprising a third detector panel and a fourth detector panel, spatially offset from the third detector panel by a second continuous passageway for the motion of the form of interest, and a location-tracking device adapted to monitor the location of the form of interest. It is thereby possible that the form of interest—e.g. the person to be scanned—merely walks through the two continuous passageways and is scanned in the process. The scan can be initiated based upon the location of the person tracked by the location-tracking device.

According to a first implementation form of the first aspect, the first detector-pair is adapted to scan a front of the form of interest, while the form of interest enters the first continuous passageway, and/or the second detector-pair is adapted to scan a back of the form of interest, while the form of interest leaves the second continuous passageway. It is thereby assured that the form of interest can be scanned from all sides without having to deliberately cooperate by turning into specific directions.

According to a second implementation form of the first aspect, the detector-pairs are adapted to perform the scans discriminating by polarization. This allows for an increased accuracy of the scan.

According to a third implementation form of the first aspect, the form of interest is a person. The system is then adapted to perform more than one scan of the front of the person, before the person enters the first continuous passageway and to perform more than one scan of the back of the person, after the person leaves the second continuous passageway. The system is then adapted to analyze the scans in groups, to analyze the presence of objects on the person's body.

According to a fourth implementation form of the first aspect, the first panel and the second panel have an angular offset from one another of 20° to 170°, preferably of 45° to 120°. The first panel and the second panel receive a reflection from the form of interest prior to the form of interest entering the first continuous passageway. Thereby, it is possible to perform scans of the form of interest before the form of interest enters the first passageway, assuring a scan of the front of the form of interest.

According to a fifth implementation form of the first aspect, the third panel and the fourth panel have an angular offset from one another of 20° to 170°, preferably 45° to 120°. The third panel and the fourth panel receive a reflection from the form of interest after the form of interest leaves the second continuous passageway. Thereby, it is possible to perform scans of the form of interest after the form of interest leaves the second passageway, assuring a scan of the rear side of the form of interest.

According to a sixth implementation form of the first aspect, the first continuous passageway and the second continuous passageway are aligned, forming a joint continuous passageway for the motion of the form of interest. An especially efficient path for the form of interest is thereby achieved.

According to a seventh implementation form of the first aspect, the system comprises a processor, which is adapted to generate an image of the form of interest, based on one or more reflections transmitted and received by the same panel, out of the first panel, the second panel, the third panel and the fourth panel, and/or one or more reflections transmitted and received by different panels from one panel-pair of the first panel-pair and the second panel-pair. This ensures an especially accurate scanning.

According to an eighth implementation form of the first aspect, at least one of the panels in each panel-pair comprises an array of microwave or millimeter wave transmitters. At least one of the panels in each pair comprises an array of microwave or millimeter wave receivers. Additionally or alternatively, the transmitters and receivers are both interspersed within the respective array. This ensures a high scanning accuracy.

According to a further implementation form of the first aspect, the transmitters are adapted to transmit one after the other at a single frequency or stepwise at different frequencies. The receivers are adapted to receive the reflection simultaneously at the frequency of transmission. The receivers are adapted to receive in a phase coherent manner. This ensures an especially high scanning accuracy.

According to a further implementation form of the first aspect, the receivers are adapted to perform a digital reception beamforming. This further increases the scanning accuracy.

According to a further implementation form of the first aspect, the transmitters are adapted to use frequency stepping in order to cover a radio frequency bandwidth at discrete frequency steps. The panels out of the first panel, the second panel, the third panel and the fourth panel are adapted to transmit in an interlaced fashion, each panel transmitting at a different frequency at the same time. This increases the scanning speed.

According to a further implementation form of the first aspect, at least one of the first panel-pair and the second panel-pair comprise two panels, each comprising transmitters, transmitting at different frequencies. This also increases the scanning speed.

According to a further implementation form of the first aspect, the system moreover comprises a motion control setup, preferably a hallway, configured to prevent the form of interest from exiting an area of scanning without passing through the first continuous passageway and/or the second continuous passageway. An especially secure setup is thereby achieved.

According to a further implementation form of the first aspect, the location-tracking device is adapted to determine approximately when the form of interest will enter an area, in which a complete scan of the form of interest can be obtained. The system is then adapted to schedule a scan of the form of interest by the first panel pair and/or the second panel pair when the form of interest will approximately enter the area. This ensures an especially quick and accurate scanning.

According to a further implementation form of the first aspect, the system furthermore comprises a metal detector, preferably a magnet-anomaly detector, adapted to detect metal within or on the form of interest, while the form of interest passes the first continuous passageway and/or the second continuous passageway. This further increases the security of the system.

According to a further implementation form of the first aspect, the form of interest is a person. The transmitters are then adapted to perform a full-body illumination of the person. This ensures a high scanning quality.

According to a further implementation form of the first aspect, the form of interest is a person. The location-tracking device then includes an optical camera and a controller for processing images recorded by the optical camera. The location-tracking device is furthermore adapted to determine approximately when the person will enter an area, in which a reflection with a sufficient illumination of the person is obtained. The system is moreover adapted to schedule a scan of the person by the first panel-pair and/or the second panel-pair when the person will approximately enter the area. An especially quick and accurate scanning is thereby achieved.

According to a further implementation form of the first aspect, the arrays of receivers comprise periodic groups of receiver clusters operating synchronously. Additionally or alternatively, the arrays of transmitters comprise periodic groups of transmitter clusters operating synchronously. This ensures an especially quick and accurate scanning.

According to a further implementation form of the first aspect, the system is adapted to use only a fraction of the transmitters of each transmitter array and/or only a fraction of the receivers of each receiver array, in order to determine lower resolution scans therefrom. The system is adapted to perform a tracking of the form of interest based upon the lower resolution scans. The system is moreover adapted to determine when the form of interest will be near a focus location and to schedule a full resolution scan of the form of interest when the form of interest will approximately be near the focus location. This ensures an especially accurate scanning.

According to a further implementation form of the first aspect, the form of interest is a walking person. This ensures an especially quick scan.

According to further implementation form of the first aspect, the transmitting and receiving surfaces of the first panel, the second panel, the third panel and the fourth panel are arranged substantially vertically. The system further comprises at least one additional panel, whose surface is not arranged vertically, and which is configured to receive reflections from portions of the walking person not in focus of the first panel, the second panel, the third panel and of the fourth panel. These portions of the walking person advantageously are an angled arm, or the top of the head, or the hair, or the bottom of the foot, or a calf outside of a viewing plane, or a foot outside of a viewing plane. This further increases the scanning accuracy.

According to a further implementation form of the first aspect, the at least one additional panel is angled orthogonally with regard to at least one of the first panel, the second panel, the third panel and the fourth panel. An especially accurate scanning is thereby achieved.

According to a further implementation form of the first aspect of the invention, the at least one additional panel is arranged above or below the walking person, and is adapted to capture reflections from the walking person's head and/or feet. A further increase in scanning accuracy is thereby achieved.

According to a second aspect of the invention, a method for scanning a form of interest, while the form of interest is in motion, is provided. The method comprises detecting with a first detector panel-pair, comprising a first detector panel and a second detector panel, spatially offset from the first detector panel by a first continuous passageway for the motion of the form of interest. The method also comprises detecting with a second detector panel-pair, comprising a third detector panel and a fourth detector panel, spatially offset from the third detector panel by a second continuous passageway for the motion of the form of interest. And the method comprises monitoring the location of the form of interest with a location-tracking device.

BRIEF DESCRIPTION OF THE DRAWINGS

An exemplary embodiment of the invention is now further explained by way of example only with respect to the drawings, in which.

DETAILED DESCRIPTION OF THE PREFERRED EMBODIMENTS

Figure 1:
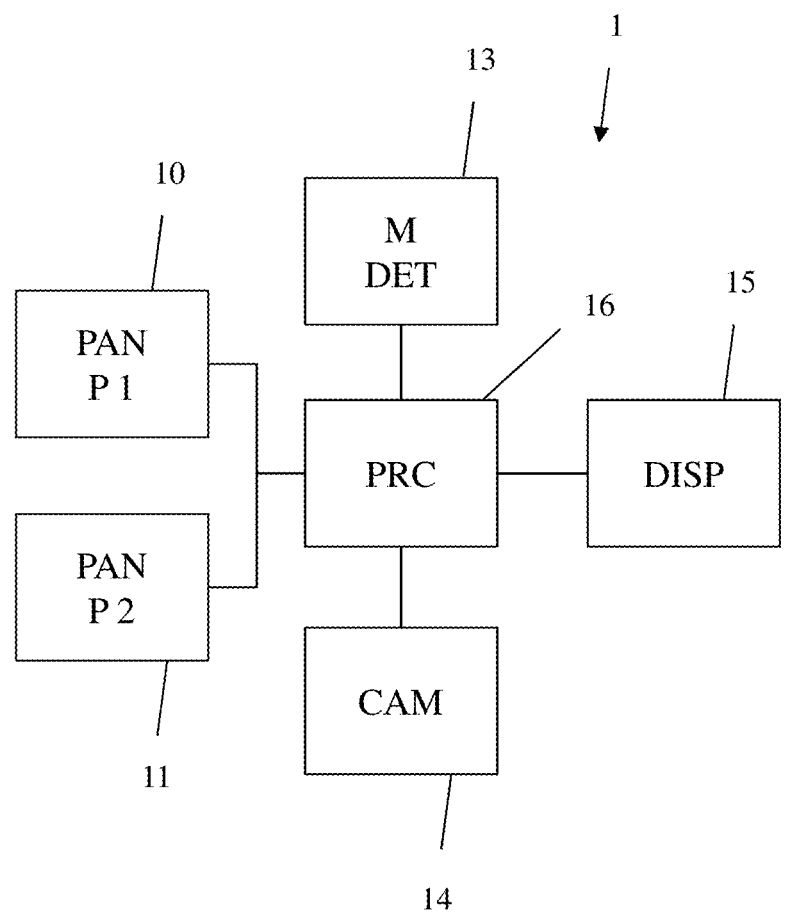
FIG. 1 shows a first embodiment of the system according to the invention in a block diagram.

First we demonstrate the general construction of an embodiment of the system according to the first aspect of the invention along FIG. 1. Along FIGS. 2-9, further details of embodiments of the system and of the method are described.

Figure 10:
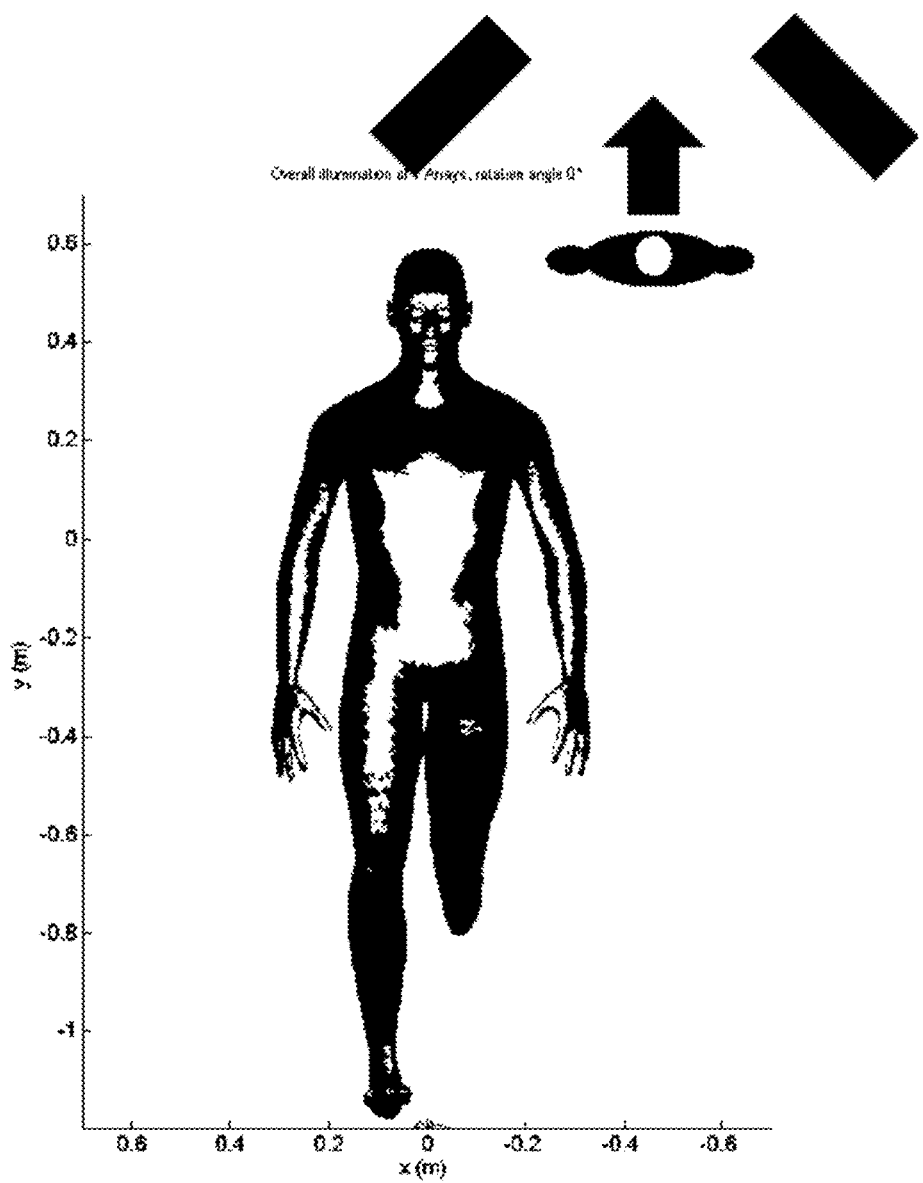
FIG. 10 shows a scanning result when using a fourteenth embodiment of the system according to the invention.
Figure 11:
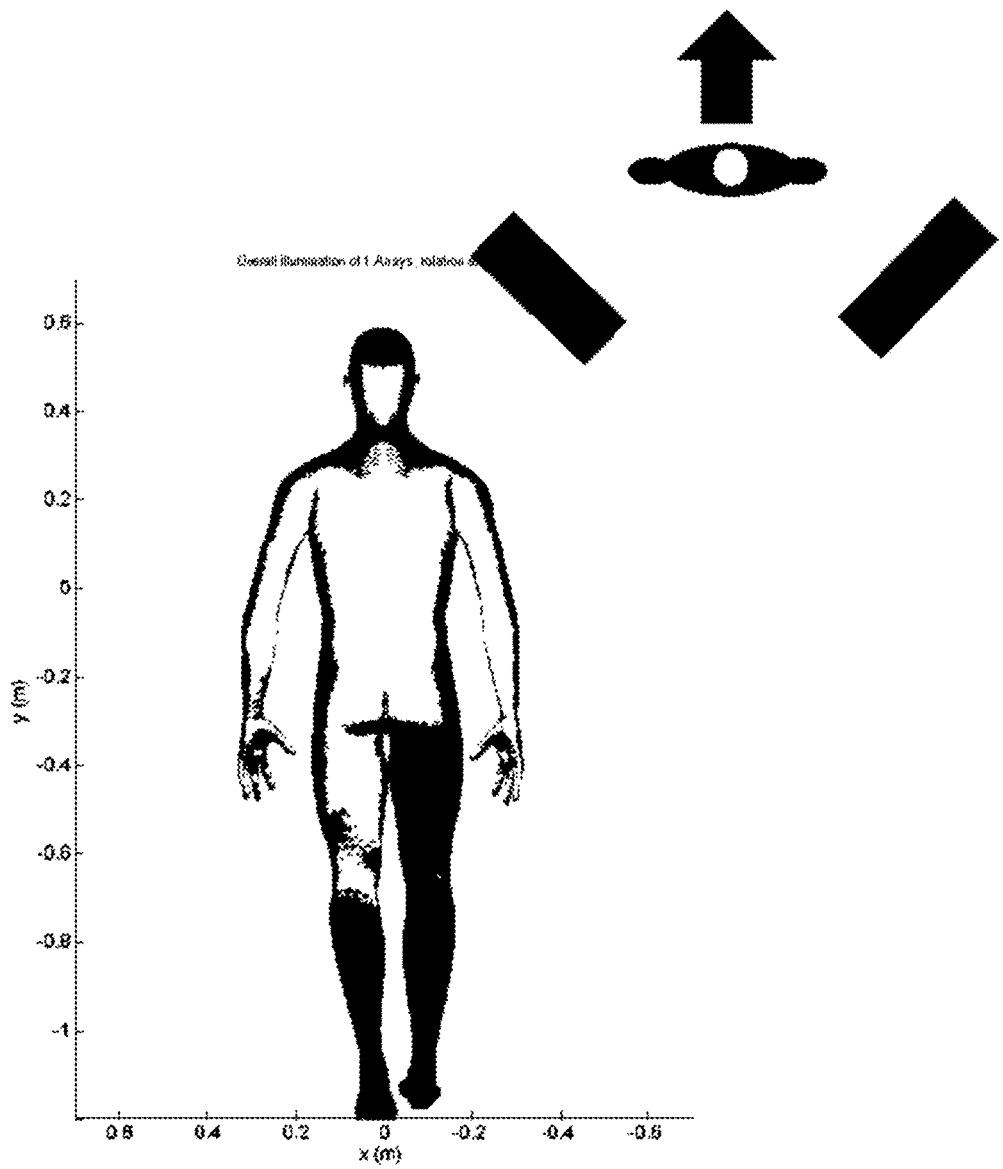
FIG. 11 shows a scanning result when using a fifteenth embodiment of the system according to the invention.

Along FIG. 10 and FIG. 11 achievable results are shown. Similar entities and reference numbers in different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

First Embodiment

In FIG. 1, a first embodiment of the system 1 for scanning a form of interest according to the first aspect of the invention is shown. The system 1 comprises a first panel-pair 10, a second panel-pair 11 connected to a processor 16. Moreover, the system 1 comprises a metal detector 13, a camera 14 and a display 15, each also connected to the processor 16. The steps for implementing the method according to the second aspect are also explained.

The first panel-pair 10 is arranged, so that it forms a first continuous passageway for the form of interest—for example a person—to pass through. The second panel-pair 11 is arranged so that it forms a second continuous passageway for the form of interest to move through. While the form of interest moves through the first continuous passageway and the second continuous passageway, the first panel-pair 10 and the second panel-pair 11 perform scans. The results of these scans are handed to the processor 16, which processes the results and determines images of the form of interest. Also, the processor can determine, if the form of interest poses a security threat from the images.

The metal detector 13 is arranged so that when the form of interest passes through the first continuous passageway and/or the second continuous passageway, it also passes through the metal detector 13. The metal detector 13 scans the form of interest for metal and passes its result to the processor 16.

The camera 14, or more generally spoken, a location-tracking device, monitors the location of the form of interest. This information is also handed to the processor 16. Based upon the location information of the form of interest, a scan by the first panel-pair 10 and by the second panel-pair 11 can be scheduled. It is thereby possible to optimize the timing of performing the scan. Especially an ideal illumination of the form of interest can be achieved.

More detailed information regarding the setup of the system is given with regard to the following figures.

Second Embodiment

Figure 2:
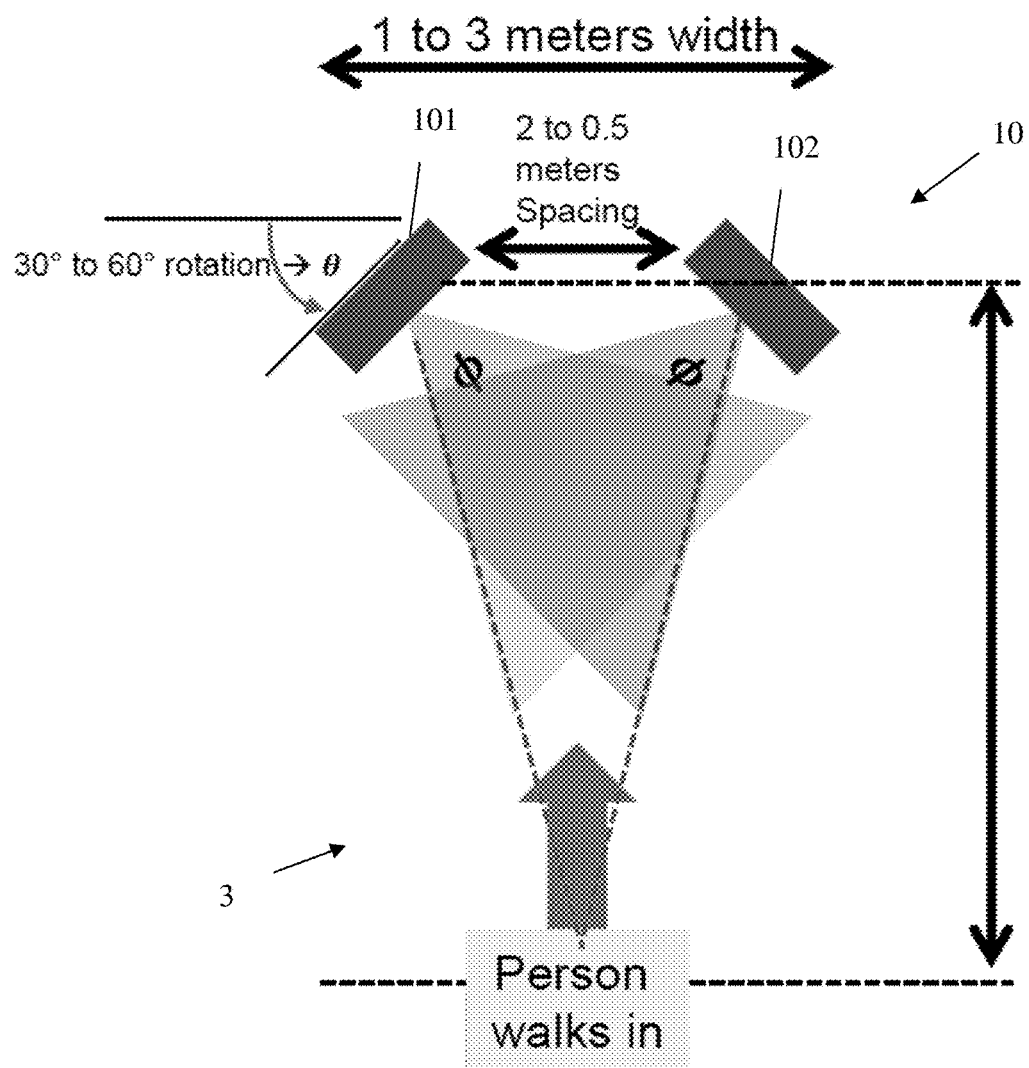
FIG. 2 shows a second embodiment of the system according to the invention.

In FIG. 2, a top-down view of a further embodiment of the system according to the first aspect of the invention is shown. Here, the first panel-pair 10 comprises a first panel 101 and a second panel 102. The first panel 101 and the second panel 102 are spaced 0.5 m-2 m apart. This spacing forms the first continuous passageway. The first panel 101 and the second panel 102 have an angular offset from one another. Here, the two-panels 101, 102 are rotated to 30°-60° with regard to the continuous passageway. More generally speaking, the angular offset of the panels 101, 102 is 20°-170°, preferably 45°-120°, with regard to each other. This leads to an intersection of the scanning areas of the two panels 101, 102.

In this figure, it is especially evident, that when the form of interest 3—here a person—walks towards the first panel-pair 10, it enters the scanning range eventually. By timing the scan correctly, an optimal scan of the form of interest 3 can be performed. Such a timing can be based upon preliminary scans using a reduced resolution or based upon information provided by a location-tracking device, for example a camera 14, as shown in FIG. 1.

In FIG. 2,
ϕ is antenna opening angle in degrees,
θ is the rotation angle of the array surface,
X is the spacing between arrays in meter,
L is the single array length,
A resulting scanning range is $$= \left(\frac{X}{2} + \frac{L}{\cos(\theta)}\right) \cdot \tan\left(90° + \frac{\phi}{2} - \theta\right)$$

Typical values of the above specified variables are ϕ=70°, θ=60°, X=0.8 m, L=0.35 m, resulting in a scanning range of 2.35 m.

Third Embodiment

Figure 3:
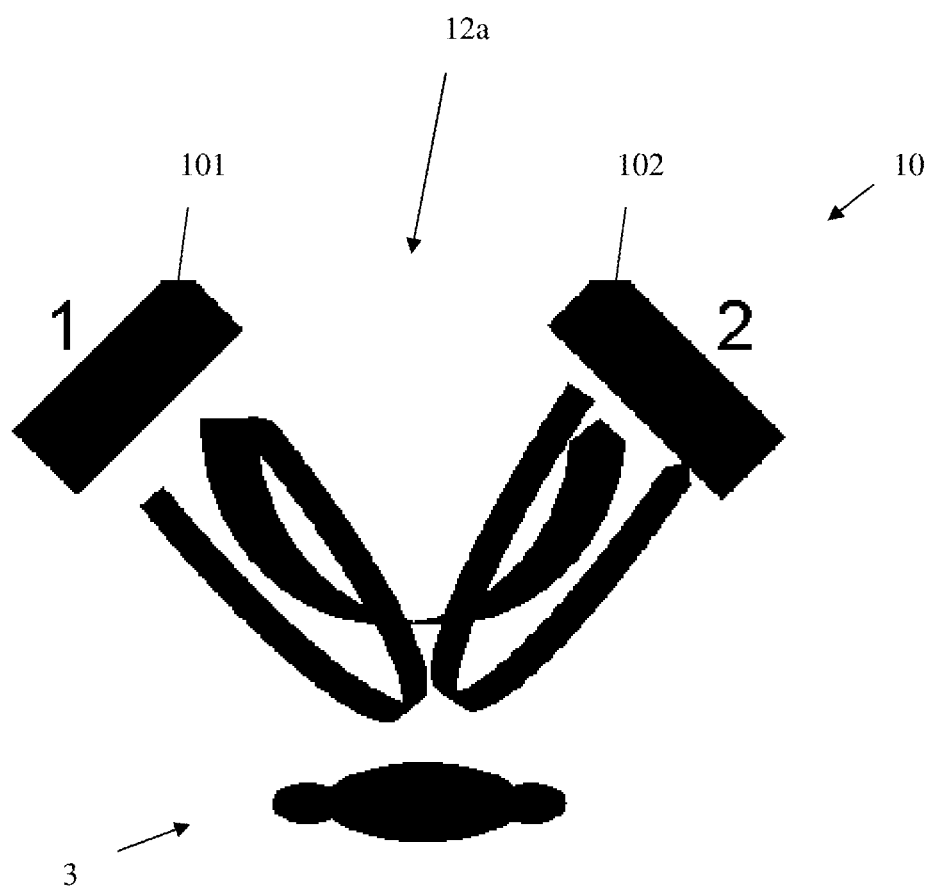
FIG. 3 shows a third embodiment of the system according to the invention.

In FIG. 3, a third embodiment of the system according to the first aspect of the invention is shown. Again, here a first panel-pair 10 comprising a first panel 101 and a second panel 102 is shown. In FIG. 3, additionally, the first continuous passageway 12a is marked.

When performing a scan, there are several options. The individual panels 101, 102 can transmit and receive signals individually. This means that the first panel 101 transmits a signal, which is reflected by the form of interest 3. The reflected signal is again received by the first panel 101. An identical measurement can be performed by the second panel 102. These types of measurements can also be performed simultaneously, if the first panel 101 and the second panel 102 transmit on different frequencies. This referred to as interlaced scanning.

Also, a measurement using both panels, 101, 102 is possible. For example, the first panel 101 transmits a signal, which is reflected by the form of interest 3 and received by the second panel 102. Also a reverse measurement, with the second panel 102 transmitting and the first panel 101 receiving is possible.

In general it is to be noted, that the panels 101, 102 use millimeter wave radiation or microwave radiation for performing the scans. It is possible to scan using only a single frequency, but also a frequency sweep through a bandwidth can be used. Especially, a frequency stepping through a number of discrete frequency steps is possible.

Advantageously, the receivers within the panel-pairs are adapted to perform a reception beamforming in a digital manner. Thereby, an increase of scanning resolution can be achieved.

In addition to the first panel-pair and to the second panel-pair, which are arranged substantially vertically, the system can comprise one or more additional panels for scanning surfaces not scannable by the first panel-pair and the second panel-pair due to their orientation. Especially surfaces orthogonal to the first panel-pair and the second panel-pair can be scanned by the additional at least one panel. This panel is advantageously arranged orthogonally to the first panel-pair and the second panel-pair. It can be arranged above or below the form of interest. Such additional panels are especially useful for scanning an angled arm, or the top of the head, or the hair, or the bottom of the foot, or an angled calf of a person to be scanned.

Fourth Embodiment

Figure 4:
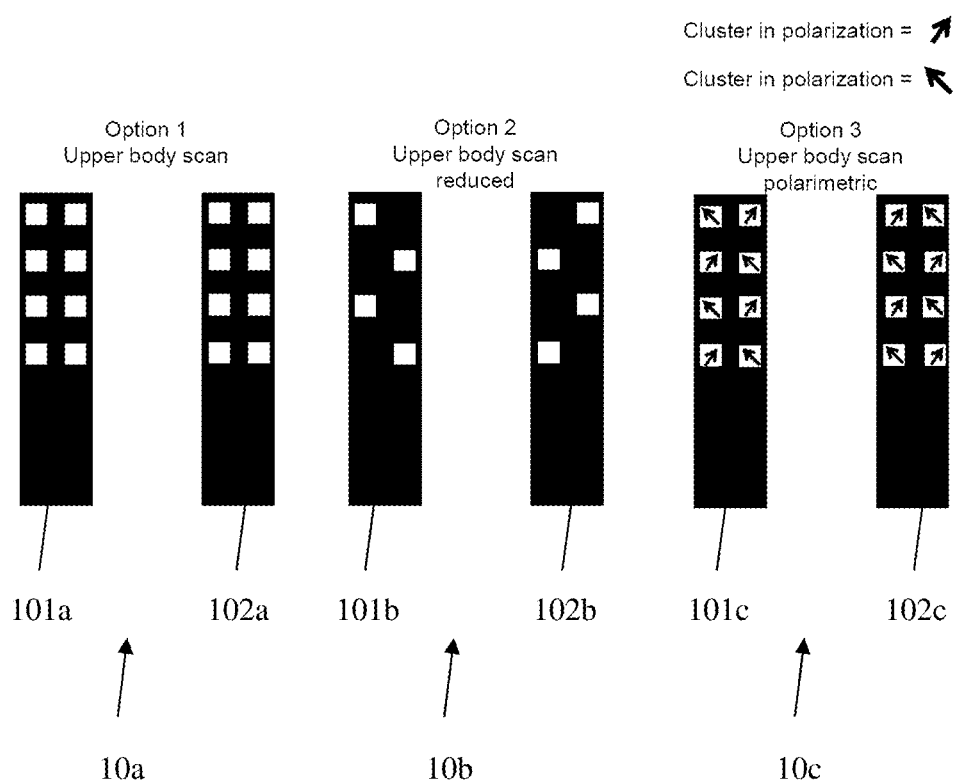
FIG. 4 shows a fourth embodiment, a fifth embodiment, and a sixth embodiment of the system according to the invention.

In FIG. 4, on the left side, a fourth embodiment of the system according to the first aspect of the invention is shown. Here, a first panel-pair 10a, comprising a first panel 101a and a second panel 102a is shown. Here, the system is optimized for performing an upper-body scan.

Only the upper part of the panels 101a, 102a comprises antenna arrays. The antenna arrays are depicted as small boxes, here. The antenna arrays therein can be dedicated transmitters or receivers, or can be used for both.

Fifth Embodiment

In the middle of FIG. 4, a fifth embodiment of the system according to the first aspect of the invention is shown. Here, a first panel-pair 10b, comprising a first panel 101b and a second panel 102b are depicted. Here, a reduced number of antenna arrays is employed. This allows for a significant reduction in production cost, while at the same time only minimally reducing the scanning resolution and increasing the scanning time.

Sixth Embodiment

On the right side of FIG. 4, a sixth embodiment of the first aspect of the invention is shown. Here, a first panel-pair 10c comprises a first panel 101c and a second panel 102c. Here, the antenna arrays each have a specific polarization. This means that the respective antenna array can only transmit and/or receive electromagnetic radiation of the respective polarization of the array. This allows for an increased scanning quality, while not significantly increasing the production cost in comparison to the fourth embodiment.

Seventh Embodiment

Figure 5:
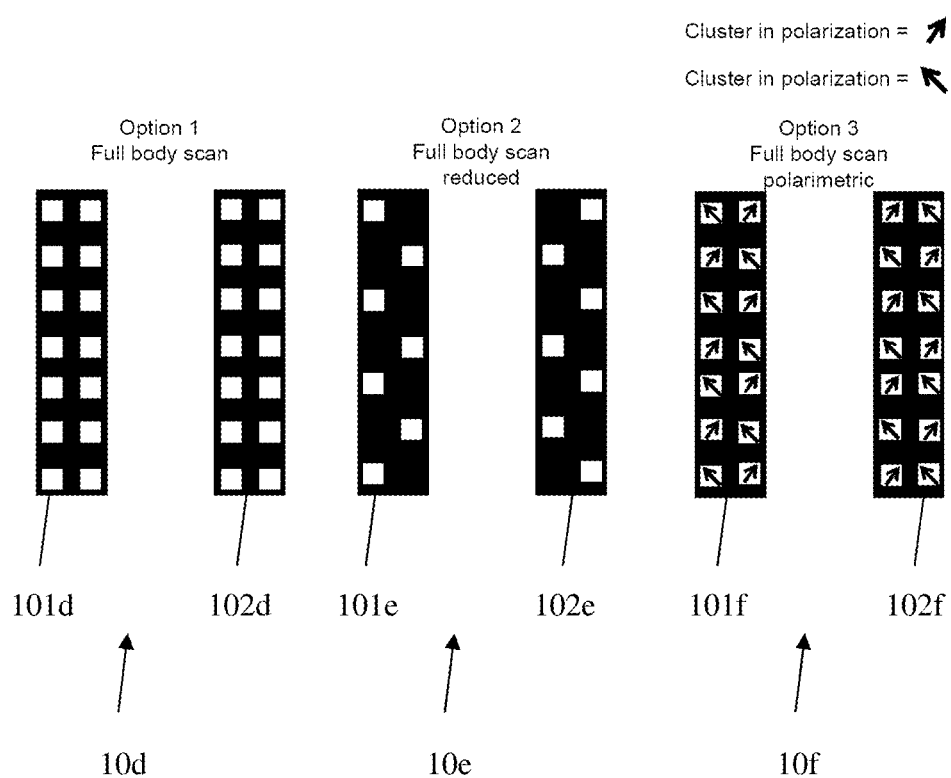
FIG. 5 shows a seventh embodiment, an eighth embodiment, and a ninth embodiment of the system according to the invention.

On the left side of FIG. 5, a seventh embodiment of the first aspect of the invention is shown. Here, a first panel-pair 10d comprises a first panel 101d and a second panel 102d. Here, the panels 101d, 102d are optimized for performing full-body scans. This means that antenna arrays are arranged along the entire length of the panels 101d, 102d.

Eighth Embodiment

In the middle of FIG. 5, an eighth embodiment of the first aspect of the invention is shown. Here, a first panel-pair 10e comprises a first panel 101e and a second panel 102e. Again here, a reduced number of antenna arrays is used. This results in a small reduction in scanning quality and a small increase in scanning time, but significantly reduces the production costs of the system.

Ninth Embodiment

On the right side of FIG. 5, a ninth embodiment of the first aspect of the invention is shown. Here a first panel-pair 10f comprises a first panel 101f and a second panel 102f. Again here, polarized antenna arrays are used.

Tenth Embodiment

Figure 6:
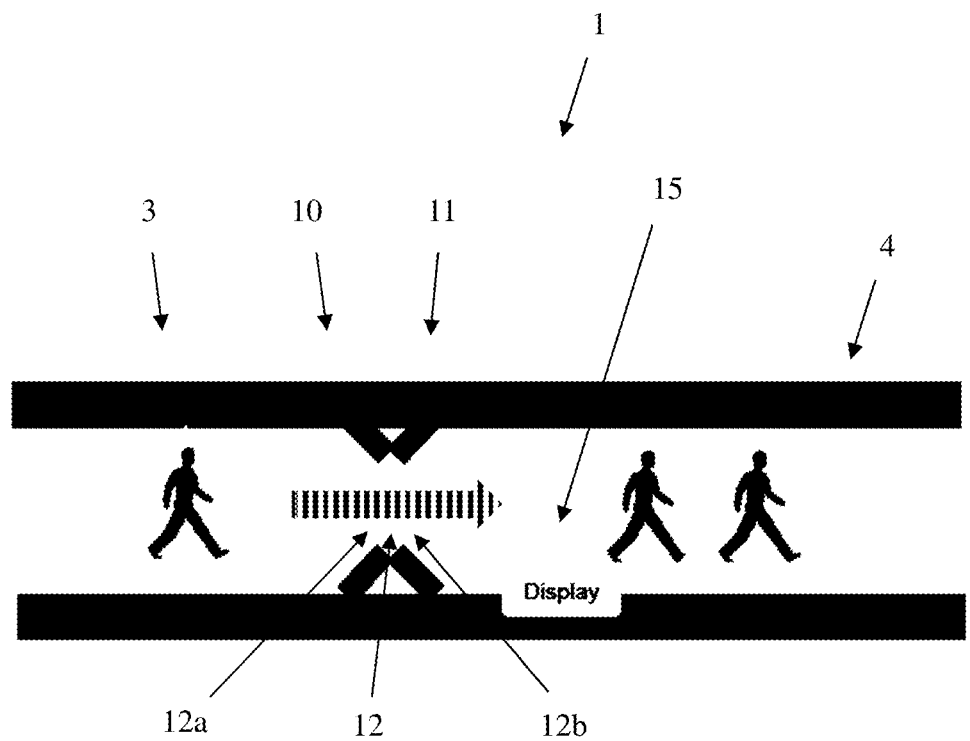
FIG. 6 shows a tenth embodiment of the system according to the invention.

In FIG. 6, a top-down view of a tenth embodiment of the first aspect of the invention is shown. The system 1 comprises a first panel-pair 10 and a second panel-pair 11 arranged in a hallway 4. More generally speaking, the hallway 4 is a motion control setup. Within the hallway 4, the first panel-pair 10 and the second panel-pair 11 are arranged, so that the form of interest 3—here a walking person—has to pass through a first continuous passageway 12a formed by the first panel-pair 10 and a second continuous passageway 12b formed by the second panel-pair 11. The first continuous passageway 12a and the second continuous passageway 12b are aligned and thereby form a joint continuous passageway 12, the form of interest 3 has to pass when moving through the hallway 4. The first panel-pair 10 is arranged so that the form of interest 3 can be scanned before the form of interest 3 passes through the joint continuous passageway 12. Especially, the front side of the form of interest 3 is scanned by the first panel-pair 10.

The second panel-pair 11 is arranged so that the form of interest 3 is scanned after leaving the joint continuous passageway 12. Especially the rear side of the form of interest 3 is scanned by the second panel-pair 11.

A decision making regarding if the form of interest is considered a security risk, can start as soon as the scan by the first panel-pair 10 is complete. Alternatively, a joint processing of the results of both panel-pairs 10, 11 can be performed. In this case, the decision making only begins after both scans have been completed. On a display 15, results of the scan can be presented to an operator.

Eleventh Embodiment

Figure 7:
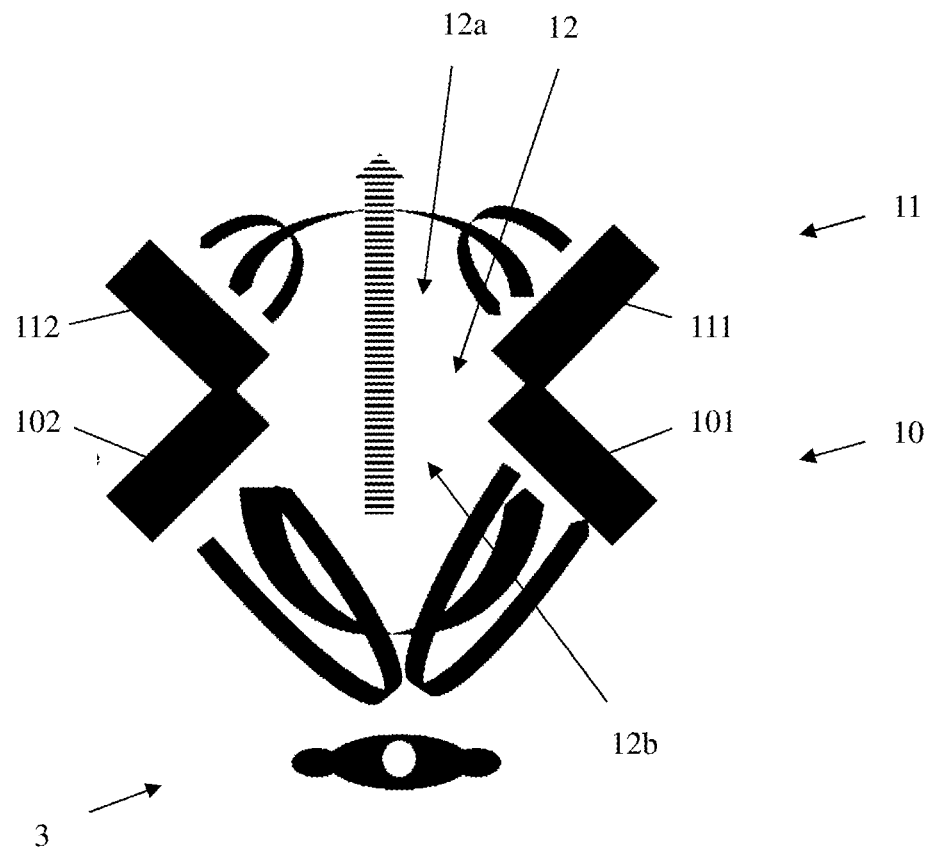
FIG. 7 shows an eleventh embodiment of the system according to the invention.

In FIG. 7, an eleventh embodiment of the system according to the first aspect of the invention is shown in a top-down view. Here, a first panel-pair 10 comprises a first panel 101 and a second panel 102. A second panel-pair 11 comprises a third panel 111 and a fourth panel 112. The panel-pairs 10, 11 are arranged back-to-back as already shown in FIG. 6.

The form of interest 3 is shown before entering the first continuous passageway 12a formed by the first panel-pair 10.

Twelfth Embodiment

Figure 8:
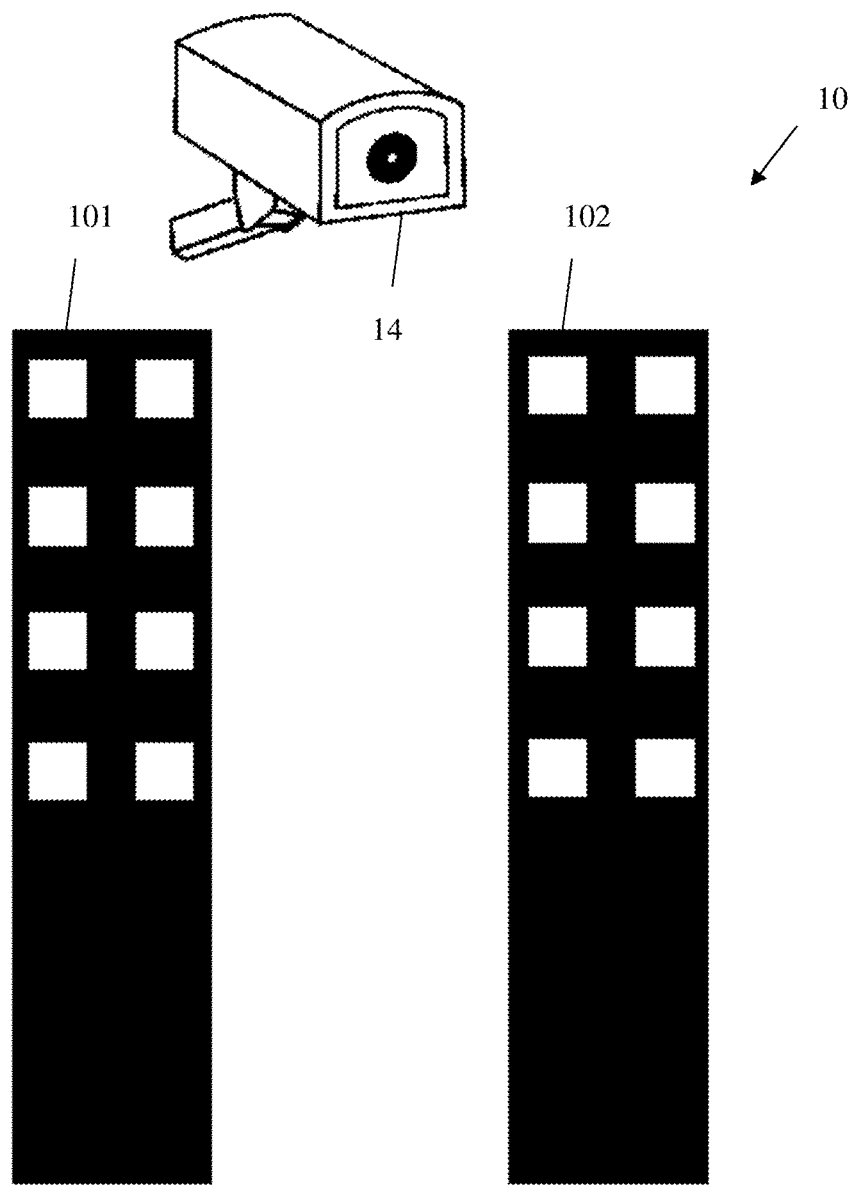
FIG. 8 shows a twelfth embodiment of the system according to the invention.

In FIG. 8, a twelfth embodiment of the first aspect of the invention is shown. Here, a first panel-pair 10 comprising a first panel 101 and a second panel 102 is shown. The system moreover comprises a camera 14, more generally speaking, a location-tracking device. The camera 14 tracks the position of the form of interest. Based upon the determined position of the form of interest, the scan by the first panel-pair 10 is scheduled. By this measure, it is possible to scan the form of interest 3 in an optimal moment. A maximum illumination of the form of interest can thereby be achieved. Also the highest resolution can be achieved, since the scan is performed when the form of interest is in optimal focus position of the panels 101, 102.

Especially the information of the location-tracking device is used to select which of a plurality of scans performed by the panel-pairs 10, 11 are to be processed. In this case, only the scanning results of a scan at optimal distance of the form of interest to the respective panel-pair is processed. By this measure, a significant reduction of the computational complexity and thereby of the scanning time can be achieved.

The camera can moreover be used to examine the clearance of the area around the form of interest. By this measure, it can be made sure that the form of interest—especially a person—does not tamper with the panels 101, 102.

The location-tracking device can be an optical camera 14 as depicted here. Alternatively, an optical stereo camera resulting in stereoscopic 3D images can be used. Also a two-dimensional infrared camera can be used. Moreover, an automotive radar camera operating at 77 GHz can be used. Such a camera achieves a two-dimensional image and additional movement information through the Doppler shift of the radar signals. Furthermore, a time of flight infrared camera resulting in a three-dimensional image can be used.

Advantageously, the panel-pairs 10, 11 can also themselves be considered as location tracking device. They are then used to perform a tracking of the form of interest 3 in order to determine the optimal time of scanning. In order to do this, only a fraction of the transmitters and receivers within each panel are used in order to form a low resolution scanning image of the form of interest. Therefrom, the range of the form of interest is estimated. Only when the form of interest reaches optimal scanning distance, a proper scan at full resolution using all transmitters and receivers is performed. Thereby, it is possible to increase the scanning accuracy without requiring an additional camera. Alternatively, this information can additionally be used. By using the low resolution ranging and the camera ranging, an especially accurate ranging of the form of interest is possible.

Thirteenth Embodiment

Figure 9:
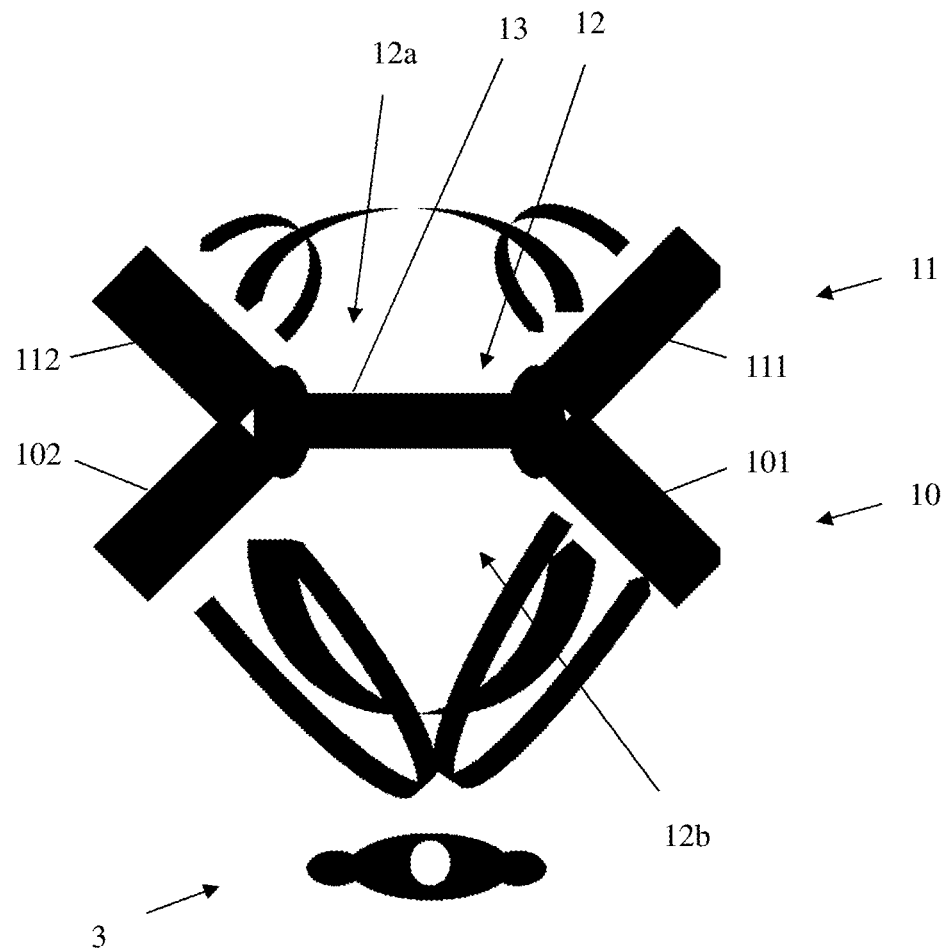
FIG. 9 shows a thirteenth embodiment of the system according to the invention.

In FIG. 9, a thirteenth embodiment of the system according to the first aspect of the invention is shown. Here, the system additionally comprises a metal detector gate 13, which is arranged within the joint continuous passageway 12. The form of interest 3 needs to pass through the metal detector gate 13 when passing through the joint continuous passageway 12. The metal detector is for example a magnet-anomaly detector. It detects metal within the form of interest 3. For example, metallic objects on the body of a person to be scanned can be detected thereby.

The detection results of the metal detector 13 are handed to the processor shown in FIG. 1. The processor then combines the scanning results of the metal detector 13 with the scanning results of the first detector-pair 10 and the second detector-pair 11.

Fourteenth Embodiment

In FIG. 10, scanning results of a fourteenth embodiment of the first aspect of the invention is shown. Here, a male subject is scanned at a range of 50 cm distance to the first continuous passageway.

Fifteenth Embodiment

In FIG. 11, scanning results of a fifteenth embodiment of the first aspect of the invention are shown. Here, scanning results of a second panel-pair scanning the rear side of a male subject after leaving the second continuous passageway 50 cm range are shown.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to the presented frequency of the employed scanning signals. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

What is claimed is:

1. A system for scanning a form of interest, while the form of interest is in motion, comprising:
    a first detector panel-pair, comprising a first detector panel and a second detector panel, the second detector panel spaced apart from the first detector panel to form a first passageway for the motion of the form of interest,
    a second detector panel-pair, comprising a third detector panel and a fourth detector panel, the fourth detector panel spaced apart from the third detector panel to form a second passageway for the motion of the form of interest, and
    a location tracking device, adapted to monitor the location of the form of interest,
    wherein the first passageway and the second passageway are aligned to form a joint passageway.

2. The system of claim 1,
    wherein the first detector-pair is adapted to scan a front of the form of interest, while the form of interest enters the first passageway, or
    wherein the second detector-pair is adapted to scan a back of the form of interest, while the form of interest leaves the second passageway.

3. The system of claim 1,
    wherein the detector-pairs are adapted to perform the scans discriminating by polarization.

4. The system of claim 1,
    wherein the form of interest is a person,
    wherein the system is adapted to perform more than one scan of the front of the person, before the person enters the first passageway, and to perform more than one scan of the back of the person, after the person leaves the second passageway, and
    wherein the system is adapted to analyze the scans in groups, to analyze a presence of objects on the person's body.

5. The system of claim 1,
    wherein the first panel and the second panel have an angular offset from one another of 20° to 170° and
    wherein the first panel and the second panel receive a reflection from the form of interest prior to the form of interest entering the first passageway.

6. The system of claim 5, wherein the angular offset is 45° to 120°.

7. The system of claim 1,
    wherein the third panel and the fourth panel have an angular offset from one another of 20° to 170° and
    wherein the third panel and the fourth panel receive a reflection from the form of interest after the form of interest leaves the second passageway.

8. The system of claim 7, wherein the angular offset is 45° to 120°.

9. The system of claim 1,
wherein the first passageway and the second passageway are aligned, forming a joint passageway for the motion of the form of interest.

10. The system of claim 1,
wherein the system comprises a processor adapted to generate an image of the form of interest, based on:
one or more reflections transmitted and received by the same panel, out of the first panel, the second panel, the third panel and the fourth panel, or
one or more reflections transmitted and received by different panels from one panel-pair, out of the first panel-pair and the second panel-pair.

11. The system of claim 1,
wherein at least one of the panels in each panel-pair comprises an array of microwave or millimeter wave transmitters, and
wherein at least one of the panels in each panel-pair comprises an array of microwave or millimeter wave receivers, or
wherein the transmitters and receivers are both interspersed within the respective array.

12. The system of claim 11,
wherein the transmitters are adapted to transmit one after the other at a single frequency or stepwise at different frequencies, and
wherein the receivers are adapted to receive reflections simultaneously at the frequency of transmission, and
wherein the receivers are adapted to receive in a phase-coherent manner.

13. The system of claim 12,
wherein the receivers are adapted to perform a digital reception beamforming.

14. The system of claim 11,
wherein the transmitters are adapted to use frequency stepping in order to cover a radio frequency bandwidth at discrete frequency steps, and
wherein the panels out of the first panel, the second panel, the third panel and the fourth panel are adapted to transmit in an interlaced fashion, each panel transmitting at a different frequency at the same time.

15. The system of claim 11,
wherein at least one of the first panel-pair and the second panel-pair comprise two panels, each comprising transmitters, transmitting at different frequencies.

16. The system of claim 11,
wherein the form of interest is a person, and
wherein the transmitters are adapted to perform a full body illumination of the body of the person.

17. The system of claim 11,
wherein the arrays of receivers comprise periodic groups of receiver clusters operating synchronously, or
wherein the arrays of transmitters comprise periodic groups of transmitter clusters operating synchronously.

18. The system of claim 11,
wherein the system is adapted to use only a fraction of the transmitters of each transmitter array or only a fraction of the receivers of each receiver array, in order to determine lower resolution scans therefrom,
wherein the system is adapted to perform a tracking of the form of interest based upon the lower resolution scans,
wherein the system is adapted to determine when the form of interest will be adjacent to a focus location, and
wherein the system is adapted to schedule a full resolution scan of the form of interest when the form of interest will be approximate to the focus location.

19. The system of claim 1,
wherein the system comprises a motion control setup, preferably a hallway, configured to prevent the form of interest from exiting an area of scanning without passing through the first passageway and the second passageway.

20. The system of claim 1,
wherein the location tracking device is adapted to determine approximately when the form of interest will enter an area, in which a complete scan of the form of interest can be obtained, and
wherein the system is adapted to schedule a scan of the form of interest by the first panel-pair and/or the second panel-pair when the form of interest will approximately enter the area.

21. The system of claim 1,
wherein the system further comprises a metal detector, preferably a magnetic-anomaly detector, adapted to detect metal within or on the form of interest, while the form of interest passes the first passageway or the second passageway.

22. The system of claim 1,
wherein the form of interest is a person, and
wherein the location tracking device includes an optical camera and a controller for processing images recorded by the optical camera,
wherein the location tracking device is adapted to determine approximately when the person will enter an area, in which a reflection with sufficient illumination of the person is obtained, and
wherein the system is adapted to schedule a scan of the person by the first panel-pair or the second panel-pair when the person will approximately enter the area.

23. The system of claim 1,
wherein the form of interest is a walking person.

24. The system of claim 23,
wherein transmitting and receiving surfaces of the first panel, the second panel, the third panel, and the fourth panel are arranged substantially vertically,
wherein the system further comprises at least one additional panel, which has a surface that is not arranged vertically, and which is configured to receive reflections from portions of the walking person not in focus of the first panel, the second panel, the third panel, and the fourth panel, and
wherein the portions of the walking person advantageously are an angled arm, or the top of the head, or the hair, or the bottom of the foot, or a calf outside of a viewing plane, or a foot outside of the viewing plane.

25. The system of claim 24,
wherein the at least one additional panel is angled orthogonally with regard to at least one of the first panel, the second panel, the third panel, and the fourth panel.

26. The system of claim 24,
wherein the at least one additional panel is arranged above or below the walking person, and is adapted to capture reflections from the walking person's head or feet.

27. The system of claim 1, wherein the location tracking device comprises an optical stereo camera, a two-dimensional infrared camera, an automotive radar camera, or a time of flight infrared camera.

28. A method for scanning a form of interest, while the form of interest is in motion, comprising the steps of:

detecting with a first detector panel-pair, comprising a first detector panel and a second detector panel, the second detector panel spaced apart from the first detector panel to form a first passageway for the motion of the form of interest, detecting with a second detector panel-pair, comprising a third detector panel and a fourth detector panel, the fourth detector panel spaced apart from the third detector panel to form a second passageway for the motion of the form of interest, and monitoring the location of the form of interest with a location-tracking device, wherein the first passageway and the second passageway are aligned to form a joint passageway.

\* \* \* \* \*